United States Patent [19]

Knezevic et al.

[11] 3,901,824

[45] Aug. 26, 1975

[54] NEW CATALYST IN THE DIRECT SYNTHESIS OF DIMETHYLTIN DICHLORIDE

[75] Inventors: Vasilije Knezevic, Brooklyn, N.Y.; Mark W. Pollock, Teaneck, N.J.; Koei-Liang Liauw, Parsippany, N.J.; Gerald Spiegelman, Wayne, N.J.

[73] Assignee: Witco Chemical Corporation, New York, N.Y.

[22] Filed: Aug. 3, 1973

[21] Appl. No.: 385,524

[52] U.S. Cl. ............................ 252/429 R; 260/429.7
[51] Int. Cl. ............................................. B01j 11/78
[58] Field of Search ............... 260/429.7; 252/429 R

[56] References Cited
UNITED STATES PATENTS

| | | | |
|---|---|---|---|
| 3,280,030 | 10/1966 | Kay et al. | 252/49.7 |
| 3,446,826 | 5/1969 | Coates et al. | 260/429.7 |
| 3,459,779 | 8/1969 | Neumann | 260/429.7 |
| 3,651,108 | 3/1972 | Giannaccari | 260/429.7 |

OTHER PUBLICATIONS

Yamada et al., Chemical Abstracts 67 (1967) No. 11940 (abstract of Japanese Pat. No. 3194(67)).

*Primary Examiner*—Arthur P. Demers
*Attorney, Agent, or Firm*—Morton Friedman; Jordan J. Driks; Albert L. Gazzola

[57] ABSTRACT

Dimethyltin dichloride is prepared by reacting tin metal with methyl chloride at 65°–230°C. in the presence of a catalyst system consisting of tin tetrachloride and trihydrocarbyl phosphine or trihydrocarbyl amine, having 3–24 carbon atoms. The trihydocarbyl amine or trihydrocarbyl phosphine may be quaternized before use. Pure dimethyltin dichloride is obtained in high yields and very light color with little or no toxic trimethyltin chloride without the need of recycling or other subsequent chemical purification. The process can be operated at atmospheric or elevated pressure.

5 Claims, No Drawings

NEW CATALYST IN THE DIRECT SYNTHESIS OF DIMETHYLTIN DICHLORIDE

This invention relates to the direct methylation of metallic tin with methyl chloride for the preparation of dimethyltin dichloride useful in the preparation of PVC stabilizers or as a scratch-proofing agent for glass.

Extensive literature describes the direct alkylation of tin metal or tin alloys. However, these direct alkylation processes suffer from the disadvantage that relatively expensive iodides, bromides, or iodine itself must be used as starting materials and/or catalysts, in order to secure reasonable yields of dialkytin dihalides in practical reaction times. Even under such conditions, undesirable reaction products are formed. These products must be eliminated by recycling or other chemical operations, thus affecting the economics of these processes.

For instance, Blitzer et al., in U.S. Pat. No. 2,852,543, Sept. 6, 1958, prepare a mixture of organotins by alkylating a sodium-tin alloy with alkyl chloride under pressure at 140°–200°C. with a tin conversion of 18–35%. Yatagai et al, in U.S. Pat. No. 3,085,102, Apr. 9, 1963, alkylate tin with an alkyl halide in the presence of an iodide, a metal other than tin, and an inert oxygen containing solvent to yield mixtures of alkyltin halides. Nitto, in British Pat. No. 1,053,966, Apr. 15, 1964, teaches the alkylation of tin with an alkyl halide in the presence of catalyst consisting of a nitrogen or phosphorus compound and iodine or an iodide. As the examples of Nitto show, the organotin halides obtained contain substantial amounts of trialkyltin halides which are undesirable by-products in the conversion or organotins to resin stabilizers. Coates et al., in U.S. Pat. No. 3,308,142, Mar. 7, 1967, attempt to recover the iodine values in the reaction of alkyl iodide with metallic tin by reacting the alkyltin iodide with an alkyl phosphate or phosphite ester. Hoye in U.S. Pat. No. 3,415,857, Dec. 10, 1968, uses a catalyst system consisting of an onium compound for direct alkylation of tin with an alkyl halide. This catalyst system of Hoye comprises an organic quaternary ammonium or phosphonium halide with a preformed stannous or organotin chloride or bromide in substantially equimolar proportions to the onium compound, and optionally a metal other than tin. The onium compound may be formed in situ, or added preformed. Recycle of the catalyst residue is also shown. It is suggested when recycling, to interrupt distilling-off of the organotin halides before completion, thus eliminating the need for adding organotin halide or stannous halide to the onium compound in a batch or continuous process. As a matter of fact, dialkyltin dichlorides in reasonable yields are obtained only by recycling the catalyst, as exemplified by Examples 10 and 11.

Molt et al., in U.S. Pat. No. 3,519,665, July 7, 1970, claim a process for preparing dialkyltin dichlorides by direct alkylation of tin metal with an alkyl chloride in the presence of a tetra-alkyl phosphonium or ammonium iodide as catalyst, and recycling all of the organotin chlorides remaining after separating the dialkyltin dichlorides from the initial reaction mixture, i.e. recombining the original catalyst with the distillation and filtrate residues of the dialkyltin dichlorides after each run. As the examples of Molt et al. show, in the first run, that is before the residual organotin chlorides are returned to the onium catalyst, the tin yields are poor and substantial amounts of trialkyltin chloride are formed, except for Example 4 where preformed diorganotin dichloride is added to fresh tetraalkyl phosphonium or ammonium iodide.

An object of the instant invention is to provide a new catalyst system, not requiring iodides or bromides, for the production of dimethyltin dichloride.

We have found that the combination of a trihydrocarbyl phosphine or a trihydrocarbyl amine with tin tetrachloride constitutes an excellent catalyst system for the preparation of dimethyltin dichloride by the direct methylation of tin metal with methyl chloride. Such a catalyst surprisingly so directs the methylation of tin that dimethyltin dichloride is formed in very high yields and in such high purity that recycling, conversion of undesired tin compounds, or any other subsequent reaction steps can be dispensed with, thus affording a true one-step process.

An advantage of the present invention is in the relatively low cost of the catalyst system. In a preferred aspect of the invention, the dimethyltin dichloride made according to the present invention contains less than 0.1% trimethyltin chloride and is almost colorless so that it may be converted as is into a resin stabilizer, or used as a scratch-proofing agent for glass, and the like, because the thus produced dimethyltin dichloride will impart neither color not turbidity to the end product.

The need of replacing alkyl iodide by another material that functions as an activator of trihydrocarbyl phosphine or trihydrocarbyl amine catalysts in a one-step tin methylation was art recognized. In some of the prior art techniques, the alkyl iodide is displaced by methyl chloride, thus contaminating the dimethyltin dichloride distilled off; see Molt et al., U.S. Pat. No. 3,519,665, col. 3, lines 8–14. Tributyl phosphine or amine quaternized by methyl chloride, do not, per se, act as catalysts for the direct methylation of tin.

The effectiveness of tin tetrachloride as a superior replacement of iodide was very unexpected, in the light of the prior art. The abovementioned Hoye U.S. Pat. No. 3,415,857, teaches the use of stannous halide or an organotin halide in combination with an onium compound as a catalyst. As is known, stannous halides can be alkylated. Glosky in U.S. Pat. No. 3,340,283, Sept. 5, 1967 and another Molt et al., U.S. Pat. No. 3,519,667, July 7, 1970, use stannous chloride as a starting material for the alkylation to monoalkyltin halides. Stannic chloride, on the other hand, has its four valencies satisfied, thus excluding alkylation. Thus, the prior art teaches away from using tin tetrachloride as a catalyst component.

The present invention provides a new catalyst and process for producing dimethyltin dichloride. The methylation of tin may be carried out at 65°–230°C. preferably at atmospheric or superatmospheric pressure. The only limitation on pressure is in the strength of the reaction vessel. Any type of tin metal, mossy, granular, or powdered may be used. In order to react all the tin, at least 2 moles of methyl chloride should be used per gram atom of tin. Although an excess of methyl chloride may be used without adverse effect, an excess of more than 8 moles of methyl chloride per gram atom of tin provides no further advantage as all of the tin will have reacted. As the catalyst, there is used about 1:4 to 2:1 molar ratio of a trihydrocarbyl phosphine or trihydrocarbyl amine having 3–24 carbon atoms and tin tetrachloride. An equimolar ratio is adantageously employed. The catalyst mixture may be employed in an amount of 0.1 to 0.6 mol of each catalyst component per gram atom of tin, but these proportions are not critical and may be varied. The phosphine or amine component of the catalyst can be quaternized with methyl chloride or a higher alkyl chloride such as butyl chloride or n-octyl chloride if desired. In the absence of tin tetrachloride, the quaternized phosphine or amine (i.e., quaternary phosphonium or ammonium chloride) is not effective as a catalyst for making dimethyltin dichloride. Full catalytic activity is obtained, however, with a quaternary chloride, such as methyl trihydrocarbyl phosphonium chloride in combination with tin tetrachloride. Under the above conditions, the tin conversion is about 100%. Stannous chloride is not as effective as tin tetrachloride.

The dimethyltin dichloride formed is distilled off and if desired, further refined by fractional distillation or recrystallization from organic solvents, e.g., hydrocarbons such as pentane, hexane, isooctane, octane, decene, tetrahydronaphthalene, benzene, toluene, gasoline and petroleum ether, as well as other solvents such as ether, alcohol, methyl alcohol, isopropyl alcohol, etc. However, such after treatment is generally superfluous, because the almost colorless distillate is pure enough to be converted, as is, into a resin stabilizer, or to be used for any other purposes. The catalyst residue may be reused or discarded. Due to its relatively low price disgarding the used catalyst still leaves the process more economical than those previously used. In either case, the yields of dimethyltin dichloride are substantially quantitative based on the amount of tin reacted.

Examples of trihydrocarbyl phosphine or trihydrocarbyl amines suitable as catalyst components are: trimethyl phosphine and amine, triisopropyl-, tributyl-, trisec.butyl-, trioctyl-, dibutyl, dodecyl-, dimethyl octadecyl-, triphenyl-, dibutyl phenyl-, phosphine and amine, and others such as diethylamino-ethanol, N,N'-diethyl aniline, and the like. As indicated above, the trihydrocarbyl phosphine or trihydrocarbyl amine catalysts may be quaternized before use. Exemplary quaternized trihydrocarbyl phosphines and amines are methyltriethyl ammonium chloride, methyltributyl phosphonium chloride and trimethylcyclohexyl ammonium chloride. Trihydrocarbyl phosphine, trihydrocarbyl amine, quaternary phosphonium chlorides and quaternary ammonium chlorides may be simultaneously present in the catalyst system. The trihydrocarbyl compounds during reaction may convert to the corresponding quaternary compounds and vice versa. The reaction may be carried out under atmosphere or elevated pressure.

As seen from the following examples, the preferred trihydrocarbyl phosphine, for the concommitant use with tin tetrachloride (stannic chloride), are tributyl phosphine and triphenyl phosphine, particularly tributyl phosphine. The preferred trihydrocarbyl amine is tributyl amine, while the preferred phosphonium and ammonium compounds are methyl tributyl phosphonium chloride and methyl tributyl ammonium chloride respectively.

It is understood that the invention is not limited by the specific examples and embodiments described hereinbelow but includes such changes and modifications as may be apparent to one skilled in the art upon reading the appended claims. All quantities in the examples are on a weight basis unless otherwise specified.

EXAMPLE 1

A 1 liter 3-necked round bottom flask, equipped with a mechanical stirrer, thermometer, and a reflux condenser is charged with 0.5 mol (101 g) of tributyl phosphine. To this is added portionwise 0.5 mol (130.3 g) of tin tetrachloride. This addition is very exothermic, and the reaction mixture is held below 100°C. by outside cooling. After the addition is completed, the pot contents are cooled to room temperature with agitation. Added to the white creamy material is 2.5 moles (297 g) of tin powder in one portion, while methyl chloride is bubbled through the reaction mixture, and the temperature is raised to 100°C. The temperature is then held for 1 hour below 130°C. in order to avoid agglomeration of the tin powder. Subsequently, the temperature is raised to 160°-180°C. The total alkylation time, at which time all the tin is consumed, is 12–18 hours. The reaction mixture is then distilled off at 150 mm pressure, raising the pot temperature up to 225°C. The distillate a colorless crystalline mass, is dimethyltin dichloride containing less than 0.1% trimethyltin chloride. The dimethyltin dichloride produced, either in solid form or as a 50% aqueous solution, does not present a significant discoloration problem on standing for several months. The chlorine analysis, (Found: 32.9% Cl, Calculated: 32.3% Cl) and gas liquid phase chromatography indicate that the distillate contains less than 0.1% trimethyltin chloride. The yield of dimethyltin dichloride isolated is 89% of theory based on tin metal reacted.

EXAMPLES 2-5

The procedure of Example 1 is repeated except that the distillation residue from the preceding run or example s used in each successive run or example, instead of fresh catalyst. The yield is based on tin consumed. The results are tabulated.

Table 1

| Example or Run | Tin Conversion % | $(CH_3)_2SnCl_2$ % Yield | $(CH_3)_3SnCl$ Content % | Reaction Time, Hrs. | Appearance of Distillate |
|---|---|---|---|---|---|
| 2 | 100 | 100.9 | <0.1 | 14 | Colorless |
| 3 | 100 | 99.8 | <0.1 | 16 | Colorless |
| 4 | 100 | 94.7 | <0.1 | 12 | Colorless |
| 5 | 100 | 101.6 | <0.1 | 15 | Colorless |

As indicated by these figures, the catalyst remains unchanged in its activity, as to yield, reaction time, and product quality. The values over 100% include some material from the immediately preceding run.

EXAMPLES 6–10

These are comparative examples wherein the procedure and equipment of Examples 1–5 is followed using as the catalyst an equimolar mixture of tributyl phosphine and butyl iodine in lieu of the catalyst of the preceding examples. The distillate on recrystallization from isoocatane discolored on standing and contained 0.5% of $(CH_3)_3SnCl$. The yield with fresh catalyst was 69% of dimethyltin dichloride. On recycling the catalyst for another four runs (examples), the yield improves considerably, i.e. it varies from 88–109%, but the reaction time increases (unless fresh catalyst is added); and the distillate darkens progressively. The trimethyltin chloride content of the recrystallized product varies from 0.5 to 1.0%. The increased reaction time and darkening of the distillate is assumed to be due to a depletion of the catalyst because of its inherent instability leading to the subsequent contamination of the distillate with an iodide.

The results show that the tributyl phosphine-butyl iodide catalyst is in several ways less advantageous than the catalyst used in Examples 1–5.

EXAMPLE 11

Monomethyl tributyl phosphonium chloride, that is the mixture of $Bu_3P + CH_3Cl$, does not act as catalyst in the direct methylation of tin. This is shown by the instant example. A round bottom flask as described in Example 1, is charged with 0.5 mol of tributyl phosphine. Methyl chloride is bubbled through the liquid for 1 hour without external heating at which time no further weight increase is observed, i.e. when 0.5 mole of $CH_3Cl$ is taken up. To the pot contents is added 2.5 moles of tin metal, and the introduction of $CH_3Cl$ is continued for another 5 hours heating to the temperatures of Example 1, i.e. 160°–180°C, but no weight increase of the reaction flask is noticed.

EXAMPLES 12 and 13

A 2 liter stirred autoclave is used, otherwise the procedure is comparable to Examples 1–5 using 20 mol % of an equimolar tributylamine-stannic chloride mixture as a catalyst. The change is 475 g of tin shot. The reaction time is 6 hours at 150°–178°C under 60–70 psig of $CH_3Cl$. The results are tabulated below with the yield being based on tin consumed. Example 12 is fresh catalyst and Example 13 is recycle catalyst from previous run.

Table III

| Example | Tin Conversion % | $(CH_3)_2SnCl_2$ Yield % | $(CH_3)_3SnCl$ Content % | Appearance of Distillate |
| --- | --- | --- | --- | --- |
| 12 1st cycle | 100 | 80 | <0.1 | off white |
| 13 4th cycle | 85 | 100 | <0.1 | off white |

The results are similar to Table 1 except for a somewhat lower tin conversion. This also shows elevated pressure can be used.

Table II

| Example | Tin Conversion % | $(CH_3)_2SnCl_2$ % Yield* | $(CH_3)_3SnCl$ Content %* | Reation Time Hrs. | Appearance of Distillate |
| --- | --- | --- | --- | --- | --- |
| 6 | 98 | 68.5 | 0.5 | 16 | light yellow |
| 7 | 100 | 99 | 1.0 | 19 | pale purple |
| 8 | 99 | 87.5 | 0.8 | 19 | purple |
| 9 | 98 | 109 | 0.8 | 22 | brownish yellow |
| 10 | 99 | 106 | 0.6 | 25 | brownish yellow |

*of recrystallized $Me_2SnCl_2$

EXAMPLES 14–19

The apparatus described in Example 1 is charged with a particular amine or phosphine, shown in Table IV, and an equimolecular amount of tin tetrachloride is added. After addition is completed, the pot contents are cooled to 50°C. and tin shot is added. Methyl chloride is bubbled through the reaction mixture, while the temperature is raised to 100°C., held below 130°C. for 1 hour, and then raised to 160°C. and held at that temperature with continued bubbling of methyl chloride. The reaction mixture is weighed after the indicated time to determine the amount of methyl chloride taken up by the reaction mixture in forming dimethyltin dichloride. From the observed weight gain, an hourly methylation rate (weight increase in grams per hour) and a degree of methylation (weight increase as % of that required to convert all tin to dimethyltin dichloride) are calculated and included in Table IV.

Table IV

| Ex Catalyst (moles) | Tin metal (moles) | Methylation time (hours) | Weight increase grams | Methylation rate g/hr. | Methylation degree (%) |
| --- | --- | --- | --- | --- | --- |
| 14 $SnCl_4$/tributyl phosphine (0.5) | 2.5 | 8 | 161 | 20.1 | 63.7 |
| 15 $SnCl_4$/triphenyl phosphine (0.32) | 1.6 | 2 | 34.8 | 17.4 | 21.6 |
| 16 $SnCl_4$/triphenyl phosphine (0.32) | 1.6 | 8½ | 143 | 16.8 | 88.4 |
| 17 $SnCl_4$/tributyl amine (0.3) | 1.2 | 7 | 61 | 8.7 | 50.3 |

Table IV -Continued

| Ex Catalyst (moles) | Tin metal (moles) | Methylation time (hours) | Weight increase grams | Methylation rate g/hr. | Methylation degree (%) |
|---|---|---|---|---|---|
| 18 SnCl₄/N,N-dimethyl-n-dodecylamine (0.3) | 1.2 | 5 | 27 | 5.4 | 22.3 |
| 19 SnCl₄/N,N-diethylaniline (0.3) | 1.2 | 5 | 17 | 3.4 | 14.0 |

Crystalline dimethyltin dichloride was recovered from each of the runs summarized in Table IV. The results of these examples demonstrate the catalytic activity of a variety of stannic chloride + amine and stannic chloride + phosphine catalytic systems for the synthesis of dimethyltin dichloride.

EXAMPLES 20–22

The procedure of Examples 14 through 19 is followed except that an equimolar mixture of tributyl phosphine and stannous chloride is used as the catalyst. The reaction mixture is weighed from time to time to determine the amount of methylchloride taken up. From the observed weight gain an hourly methylation rate and a degree of methylation are calculated and included in Table V. When the experiment is terminated after 16 hours at 160°C., much unreacted tin remains in the mixture.

Table V

| Ex Catalyst (moles) | Tin metal (moles) | Methylation time (hours) | Weight increase grams | Methylation rate g/hr. | Methylation degree (%) |
|---|---|---|---|---|---|
| 20 SnCl₂/tributyl phosphine (0.5) | 2.5 | 8 | 54.7 | 6.8 | 21.7 |
| 21 SnCl₂/tributyl phosphine (0.5) | 2.5 | 14 | 62.9 | 4.5 | 24.9 |
| 22 SnCl₂/tributyl phosphine (0.5) | 2.5 | 16 | 54.1 | 4.0 | 25.4 |

Since in Example 20 all variables were the same as in Example 14 except for the use of stannous chloride instead of tin tetrachloride, while in Examples 21 and 22 the methylation time has been extended, it can be concluded that stannous chloride is far less effective than tin tetrachloride as a component of a catalyst system for the preparation of dimethyltin dichloride.

EXAMPLE 23

To 1.2 mol of tin metal was added 0.3 mol of an equimolar SnCl₄-pyridine catalyst. Methyl chloride was bubbled through the mixture under conditions of Examples 14–19 for 5 hours without observing any weight increase of the reaction mixture. Consequently SnCl₄-pyridine is not a catalyst for the direct methylation of tin metal.

EXAMPLE 24

The apparatus of Example 1 is charged with 0.5 mole of tributyl phosphine. Methylchloride is bubbled through the liquid for 1 hour starting at 23°C. and exotherming to 81°C. when no further weight increase is observed, i.e. when 0.5 mole of methylchloride is taken up and the formation of methyltributyl phosphonium chloride is complete. Added to the flask contents is 0.5 mole of tin tetrachloride and 2.5 mole of tin metal. The introduction of methylchloride is resumed and continued for another 5 hours with the temperature rising to 160°C. in the first 2 hours and then holding steady for a weight gain of 106 grams representing a methylation rate of 21.2 grams per hour and 42% degree of methylation. Colorless crystalline dimethyltin dichloride is obtained by distilling the reaction mixture. Comparison of this example with Example 11, which does not have any tin tetrachloride, shows the effect of tin tetrachloride as a material which activates the monomethyl tributyl phosphonium chloride.

EXAMPLE 25

Methyltributylammonium chloride is prepared by introducing gaseous methyl chloride into a 2 liter stirred autoclave containing 185g of tributylamine (1 mole). Gas uptake is stopped after 2.5 hours at 150°C. under 20-50 psig of methyl chloride. The autoclave is cooled and vented. The viscous mixture is stirred at 55°C. and 261g of stannic chloride (1 mole) is added over a 1.5 hour period during which the temperature rose to 115°C. The reaction mixture is stirred for 1 hour at 150°C. and cooled to obtain 465.5g of catalyst as a dark semisolid.

Dimethyltin dichloride is prepared by introducing gaseous methyl chloride into a 2 liter stirred autoclave containing 475g metallic tin shot (4 moles) and 401g of the above catalyst. After 6 hours at 150°–168°C. under 60 psig of methyl chloride, the autoclave is cooled, vented, and discharged to recover 75.8g of unreacted tin and 1073g of reaction mixture. The tin conversion amounts to 84%. The reaction mixture is distilled to obtain 635.5g of product, b.p. 97°–122°C/111-56 mm Hg, and 397.4g of residual recovered catalyst. Analysis showed the product to contain 82.5% dimethyltin dichloride, 17.5% methyltin trichloride, and no trimethyltin chloride. The yield of dimethyltin dichloride amounts to 70.8% based on tin consumed. This example shows that the combination of methyltributylammonium chloride and tin tetrachloride is an effective catalyst for making dimethyltin dichloride. The example also shows that elevated pressures are suitable.

We claim:

1. A catalyst, for preparing dimethyltin dichloride by heating tin metal with methyl chloride, consisting essentially of tin tetrachloride and at least one organic compound selected from the group consisting of tributylamine, methyl tributyl phosphonium chloride and methyl tributyl ammonium chloride wherein said organic compound to tin tetrachloride is within a molar ratio of 1:4 to 2:1.

2. The catalyst of claim 1, wherein the organic compound is tributylamine.

3. The catalyst of claim 1, wherein the organic compound is methyl tributyl phosphonium chloride.

4. The catalyst of claim 1, wherein the organic compound is methyl tributyl ammonium chloride.

5. The catalyst of claim 2 wherein the tributyl amine and tin tetrachloride are in an about equimolar mixture.

* * * * *